(12) United States Patent
Lambert et al.

(10) Patent No.: US 10,768,948 B2
(45) Date of Patent: Sep. 8, 2020

(54) APPARATUS AND METHOD FOR DYNAMIC MODIFICATION OF MACHINE BRANDING OF INFORMATION HANDLING SYSTEMS BASED ON HARDWARE INVENTORY

(71) Applicant: DELL PRODUCTS, LP, Round Rock, TX (US)

(72) Inventors: Timothy M. Lambert, Austin, TX (US); Eugene Cho, Austin, TX (US); Pablo R. Arias, Austin, TX (US)

(73) Assignee: Dell Products, L.P., Round Rock, TX (US)

(*) Notice: Subject to any disclaimer, the term of this patent is extended or adjusted under 35 U.S.C. 154(b) by 112 days.

(21) Appl. No.: 16/042,217

(22) Filed: Jul. 23, 2018

(65) Prior Publication Data

US 2020/0026531 A1 Jan. 23, 2020

(51) Int. Cl.
*G06F 15/177* (2006.01)
*G06F 9/445* (2018.01)
*G06F 13/10* (2006.01)
*G06F 9/4401* (2018.01)
*G06F 16/245* (2019.01)

(52) U.S. Cl.
CPC ........ *G06F 9/44542* (2013.01); *G06F 9/4411* (2013.01); *G06F 13/102* (2013.01); *G06F 16/24569* (2019.01); *G06F 9/4401* (2013.01)

(58) Field of Classification Search
CPC ........... G06F 9/44542; G06F 16/24569; G06F 9/4411; G06F 13/102

USPC .............................................. 713/2
See application file for complete search history.

(56) References Cited

U.S. PATENT DOCUMENTS

| | | | |
|---|---|---|---|
| 6,295,567 B1* | 9/2001 | Bassman | G06F 13/409 361/752 |
| 6,425,079 B1* | 7/2002 | Mahmoud | G06F 9/4411 710/62 |
| 6,711,676 B1* | 3/2004 | Zomaya | G06F 8/64 713/1 |
| 7,493,497 B1* | 2/2009 | Tan, Jr. | G06F 21/602 380/277 |
| 7,911,785 B2 | 3/2011 | Coglitore et al. | |
| 9,509,767 B2 | 11/2016 | Ulrich et al. | |
| 10,242,176 B1* | 3/2019 | Sathyanarayana | G06F 21/44 |
| 2003/0112582 A1 | 6/2003 | Sanders et al. | |
| 2004/0267708 A1* | 12/2004 | Rothman | G06F 11/2284 |
| 2010/0290145 A1* | 11/2010 | Ahmad | G11B 5/54 360/31 |
| 2014/0047224 A1* | 2/2014 | Ayanam | G06F 8/654 713/1 |
| 2015/0269047 A1* | 9/2015 | Baker | G06F 9/4405 714/30 |
| 2017/0192870 A1* | 7/2017 | Kangas | G06F 11/273 |
| 2018/0011654 A1* | 1/2018 | Watanabe | G06F 3/0634 |
| 2019/0044944 A1* | 2/2019 | Christopher | H04L 63/08 |

* cited by examiner

*Primary Examiner* — Volvick Derose
(74) *Attorney, Agent, or Firm* — Larson Newman, LLP (57) ABSTRACT

An apparatus executes a boot operation, and determines a planar type associated with a motherboard. The apparatus queries an electronic database for the planar type associated with the motherboard, and identifies a branding identity that is electronically associated with the planar type.

20 Claims, 7 Drawing Sheets

Chassis ID Stored As Planar Minor in RSPI Exceptions

| | Case | BMC Action | Final CPLD Minor ID |
|---|---|---|---|
| | Factory first boot | Invalid RSPI and SPIO values<br>- BMC Boots with Planar_Type.Minor default of Fh (No specific model)<br>- IPMI command used to program Minor on RSPI, SPIO and CLPD<br>- BMC reboots hosts and itself<br>- BIOS prints early video message | |
| 1 | Blank Motherboard<br>Blank RCP | | RSPI Value |
| 2 | Motherboard replacement<br>Blank motherboard<br>Current or recycled RCP | Valid RSPI value and blank SPIO value<br>- BMC compares RSPI and SPIO values. If SPIO == blank AND RSPI == Valid, BMC copies RSPI to SPIO AND CPLD. | RSPI Value |
| 3 | RCP replacement<br>Current Motherboard<br>Blank RCP | Valid SPIO value blank RCP value<br>- BMC compares RSPI and SPIO Minor. If SPIO ==Valid AND RSPI == blank, BMC copies SPIO to RSPI AND CPLD. | SPIO Value |
| 4 | Motherboard and/or RCP reuse<br>Recycled motherboard<br>Current or reused RCP | Valid RSPI and SPIO value but different<br>- BMC compares RSPI and SPIO Minor. If SPIO ==Valid AND RSPI == valid but different, BMC copies RSPI to SPIO AND CPLD | RSPI Value |
| 5 | BMC does not boot | Minor cannot be extracted from RSPI or SPIO; CPLD remains as Fh | CPLD Default Fh |
| 6 | Missing or failed RCP<br>Blank Motherboard | Blank SPIO and invalid RSPI value<br>Minor cannot be extracted from RSPI or SPIO. Same as 1 | RSPI Value |
| 7 | Missing or failed RCP<br>Current Motherboard | Valid SPIO and invalid RSPI<br>- Minor extracted from SPIO<br>- BMC Logs missing RCP | SPIO Value |

APPARATUS AND METHOD FOR DYNAMIC MODIFICATION OF MACHINE BRANDING OF INFORMATION HANDLING SYSTEMS BASED ON HARDWARE INVENTORY

FIELD OF THE DISCLOSURE

The present disclosure generally relates to information handling systems, and more particularly relates to dynamic modification of machine branding of information handling systems based on hardware inventory.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Mobile devices, computers, servers, and other information handling systems may be dynamically branded based on a planar type. The planar type may be determined from a motherboard, a hardware processor, and/or an operating system. Once the planar type is determined, the planar type may be mapped to identify a particular manufacturer, model, and other branding identity.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
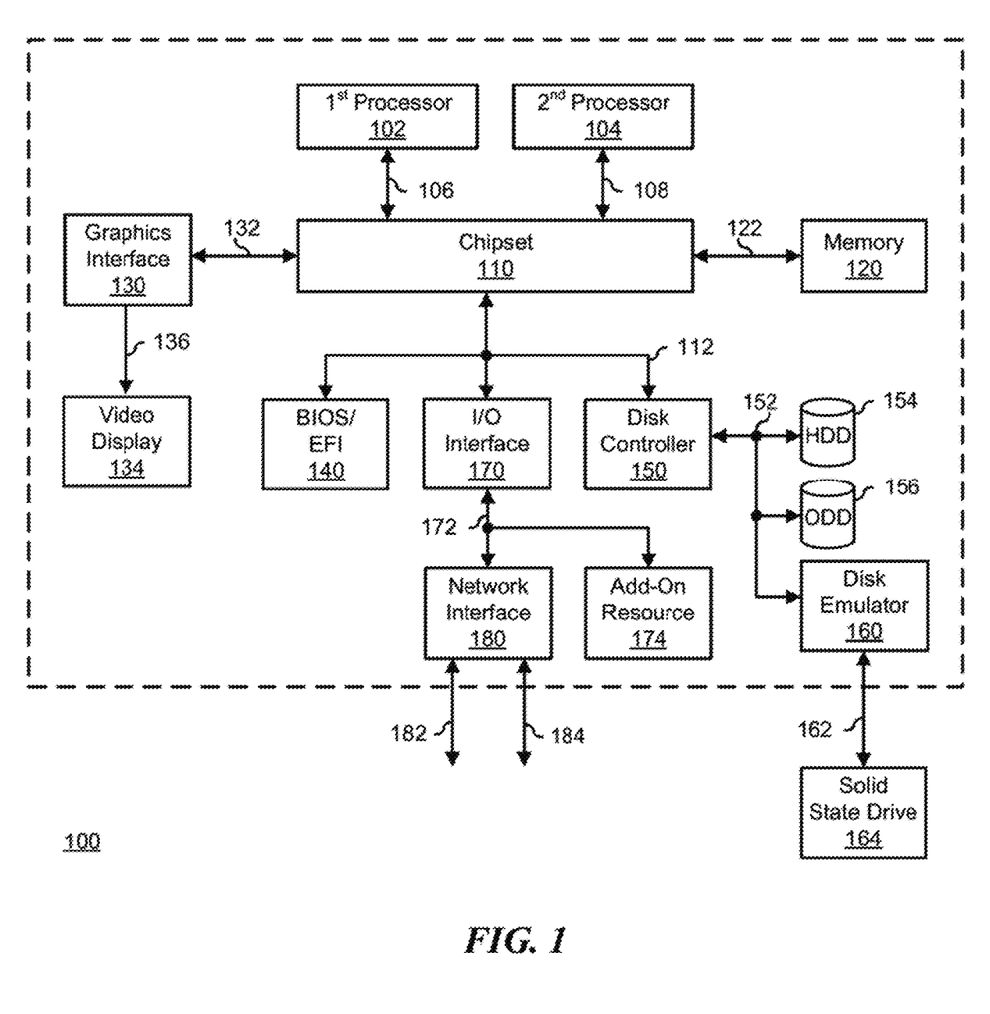
FIG. 1 is a block diagram illustrating an information handling system according to an embodiment of the present disclosure.

FIG. 1 illustrates a generalized embodiment of information handling system 100. Information handling system 100 has processors 102 and 104, a chipset 110, a memory 120, a graphics interface 130, a basic input and output system/ extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/ EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
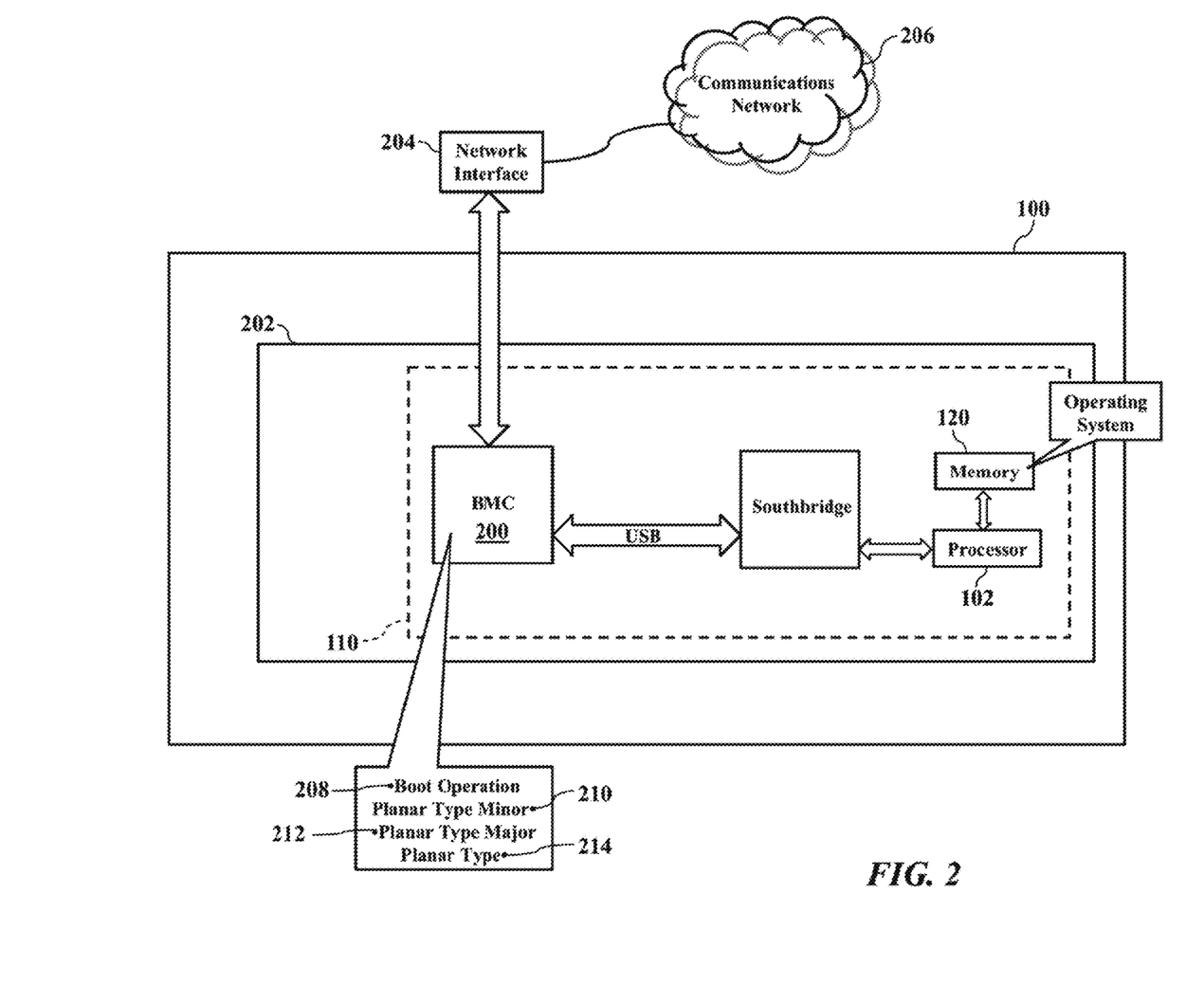
FIGS. 2-3 are simplified illustrations of dynamic branding, according to exemplary embodiments.
Figure 3:
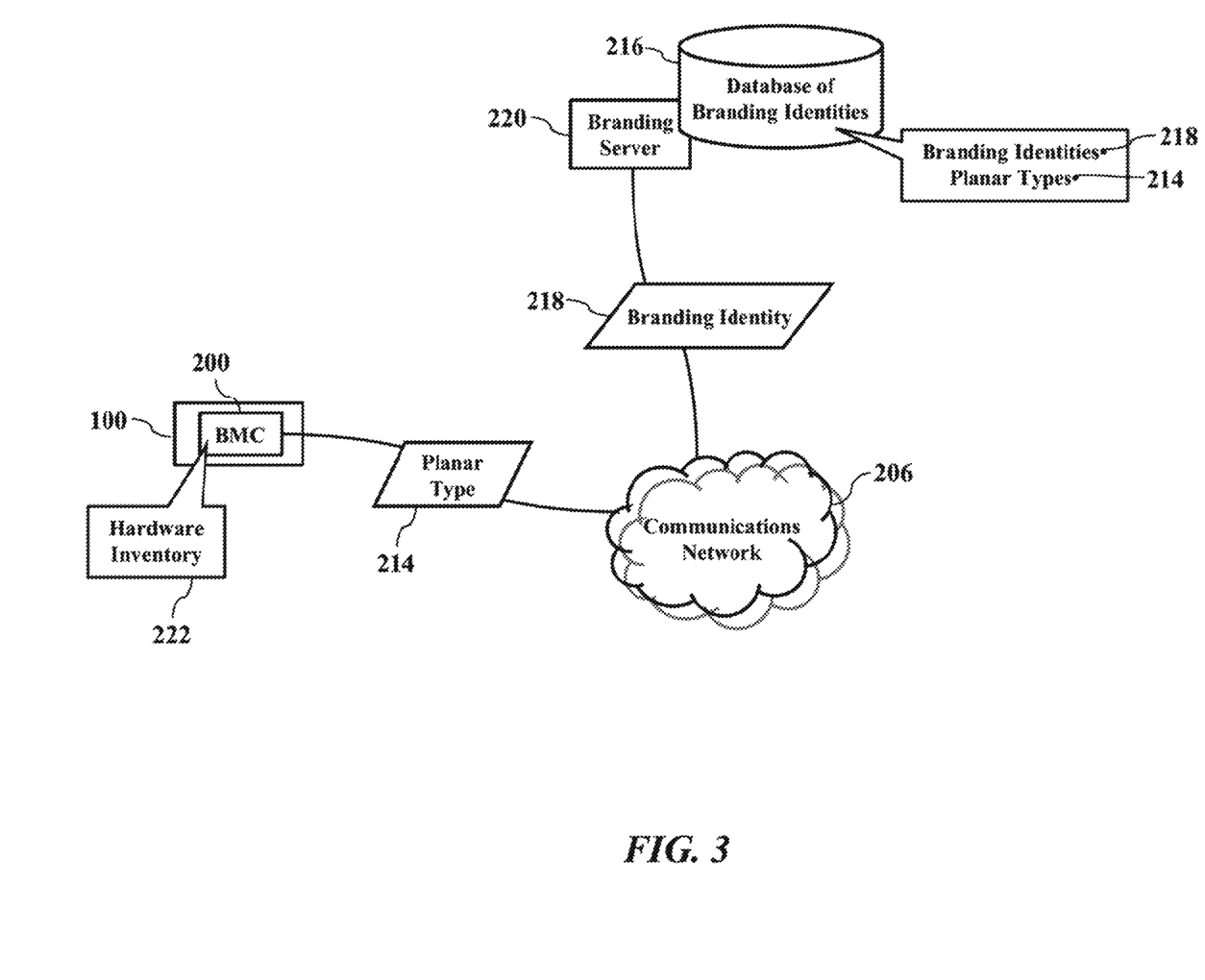

FIGS. 2-3 are simplified illustrations of dynamic branding, according to exemplary embodiments. Here the information handling system 100 may also include a baseboard management controller 200. As those of ordinary skill in the art understand, the baseboard management controller 200 has its own management processor and memory device, not shown for simplicity) that interfaces with a motherboard 202 (or "planar") to provide side-band and out-of-band remote management (perhaps according to the Intelligent Platform Management Interface specification). The baseboard management controller 200 has one or more physical communications links and interfaces to the motherboard 202, thus allowing the baseboard management controller 200 to process messages according to the IPMI specification. The baseboard management controller 200 may thus monitor and remotely report the functions and performance of the information handling system 100 via a separate network interface 204 to a communications network 206. The baseboard management controller 200 and the IPMI specification are generally well known and thus need not be explained in detail.

The baseboard management controller 200 may dynamically brand the information handling system 100. The baseboard management controller 200 conducts a novel hardware inventory. As the baseboard management controller 200 executes a boot operation 208, the baseboard management controller 200 determines a value associated with a planar type minor (e.g., planar_type.minor) 210 and determines another value associated with a planar type major (e.g., planar_type.major) 212. The baseboard management controller 200 may determine a planar type 214 based on the values associated with the planar type minor 210 and the planar type major 212.

FIG. 3 illustrates branding affinities. Once the planar type 214 is determined, the baseboard management controller ("BMC") 200 may query an electronic database 216 of branding identities. The electronic database 216 of branding identities has entries that map or relate different branding identities 218 for different planar types 214. FIG. 3 illustrates the electronic database 216 of branding identities being remotely located, stored, and accessed from a branding server 220 via the communications network 206. However, the electronic database 216 of branding identities may optionally be partially or entirely locally stored and accessed by the baseboard management controller 200. Regardless, once the planar type 214 is determined, the baseboard management controller 200 may send a query specifying the planar type 214 to the network address (e.g., Internet protocol address) associated with the branding server 220. The branding server 220 consults the electronic database 216 of branding identities and retrieves the corresponding branding identity 218. The branding server 220 may then send a query response to the network address (e.g., Internet protocol address) associated with the baseboard management controller 200. The query response specifies the branding identity 218 that is electronically associated to the planar type 214. The branding identity 218, as a simple example, may reveal a model number, programming code, and other configuration options that are based on the planar type 214. The planar type 214, in other words, may determine an expected hardware inventory 222 of the information handling system 100. So, once the planar type 214 is determined, exemplary embodiments may perform a database lookup and brand the information handling system 100 without canvassing or surveying a backplane, riser, PCI cards, or other peripheral devices.

Exemplary embodiments thus present an elegant solution. Conventional branding schemes detect the presence of a specific backplane and/or a unique riser. That is, historically the BIOS/EFI module 140 (illustrated in FIG. 1), the baseboard management controller 200, and other complex logic devices (or CPLDs) need to mutate "planar type" before anything boots (such as at time zero) to modify the model number, branding, and code conditionals that act upon that branding. This conventional approach significantly limits the customer rear system configuration options, typically to one. Exemplary embodiments, instead, merely determine the planar type 214 to identify the branding identity 218. For example, exemplary embodiments permit a hyper-segmenting marketing paradigm that allows a single server chassis to brand into more than six (6) specific models, thus providing less cost of goods sold, richer configurations, and less unique stock keeping units (SKUs) (such as for special risers). Exemplary embodiments also provide more storage centric model number mutations, and the same T-shape planar may be used between racks and towers. In other words, hardware (e.g., planar and peripheral cards) may be maximally reused for less SKU creation, unique PWA service stock, error prone field actions, as well as less engineering OpEx to support and sustain such derivatives. Moreover, exemplary embodiments permit automated validation testing to quickly and repeatedly spoof the various minor flavors of a given planar type major 212.

Figure 4:
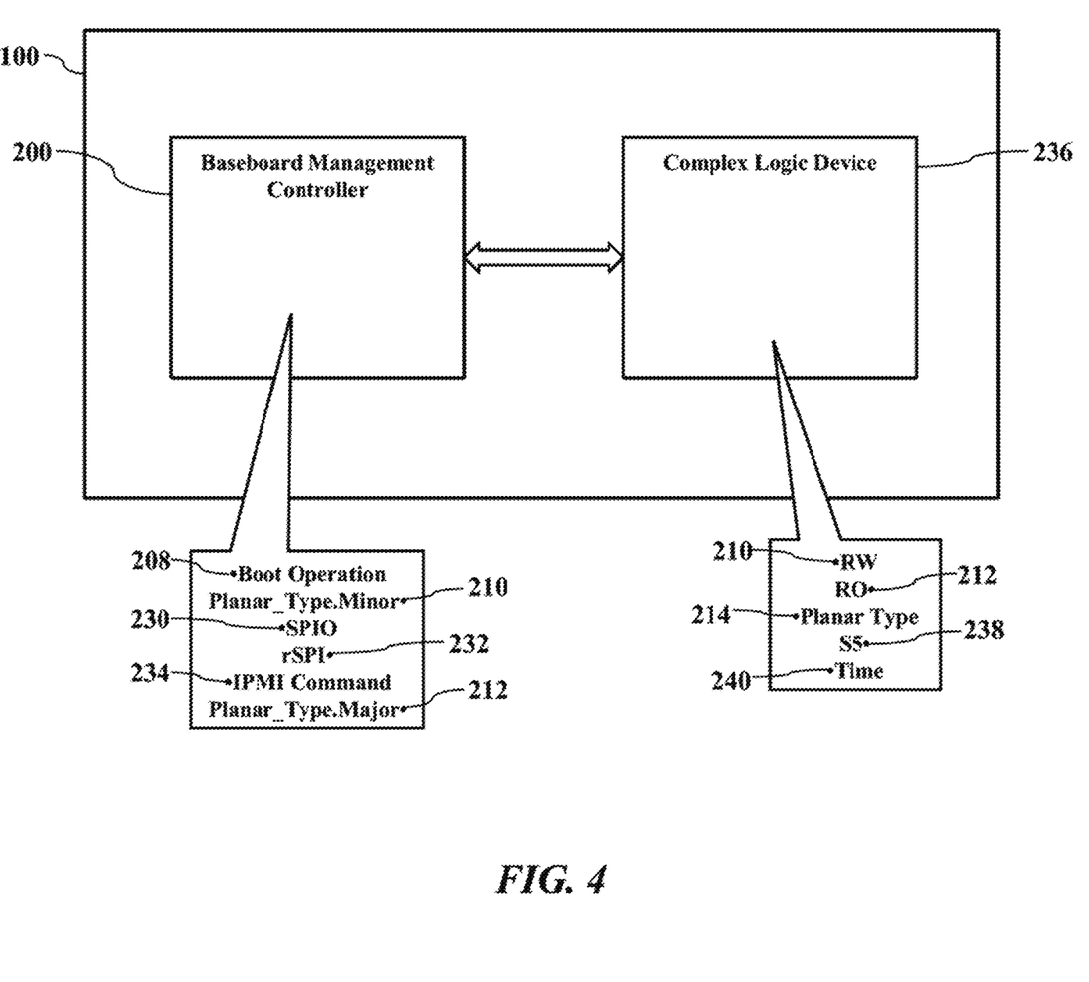
FIG. 4 is a more detailed illustration of a planar type, according to exemplary embodiments.

FIG. 4 is a more detailed illustration of the planar type 214, according to exemplary embodiments. The planar type minor 210 is preferably added as a programming or manufacturing step during manufacture and/or assembly of the information handling system 100 and/or the baseboard management controller 200. The planar type minor 210 (Planar_Type.Minor) may be programmed into the baseboard management controller 200 (such as a Serial Peripheral Interface ("SPIO") 230 and/or a restore Serial Peripheral Interface ("rSPI") 232) (associated with the flash memory device 120 illustrated in FIG. 1) via a new OEM IPMI command 234. The new OEM IPMI command 234 may be similar programming to a unique service tag, serial number, or other identifier. The planar type minor 210 extends the already existing planar type major 212 (Planar_Type.Major) provided by the CPLD and preferably only works in manufacturing mode.

The planar type minor 210 may be determined during boot. As the baseboard management controller 200 executes the boot operation 208 (such as uBoot), the baseboard management controller 200 reads a value associated with the rSPI 232 (such as an offset) to extract the planar type minor 210. The baseboard management controller 200 may also read the current value stored in the SPIO 230 as another variant of the planar type minor 210. The baseboard management controller 200 may compare the value of the rSPI 232 and the value of the SPIO 230. If the rSPI 232 matches the SPIO 230, then the final matching value of the planar type minor 210 is written to the complex logic device ("CPLD") 236. The CPLD 236 may thus store both a value associated with the planar type major 212 (e.g., illustrated as "RO") and another value associated with the planar type minor 210 (e.g., illustrated as "RW"). The CPLD 236 constructs the planar type 214 based on the planar type major 212 and another value associated with the planar type minor 210 (perhaps only once per BMC boot).

Timing requirements may be implemented. For example, while the planar type 214 is being determined, the CPLD 236 may hold the hosting information handling system 100 in an S5 power state 238 of operation for a period 240 of time (such as a maximum of ten (10) seconds). The S5 power state 238 of operation thus delays power on requests in order to give the boot operation 208 (uboot) and any early kernel determinations a chance to execute. Of course, if the baseboard management controller 200 clears the hold, then the CPLD 236 may release the hold on the S5 power state 238 of operation. Moreover, if the planar type 214 implies that a hardware root of trust is required, then exemplary embodiments may extend the period 240 of time that the information handling system 100 is held in the S5 power state 238 of operation.

The S5 power state 238 of operation may be considered a shutdown state. When the information handling system 100 is held in the S5 power state 238 of operation, the information handling system 100 may have no memory state and may not perform computational tasks. Electrical power consumption (provide by a power supply, not shown for simplicity) may be minimal.

Exemplary embodiments thus present an elegant solution. Exemplary embodiments provide planar type mutation using the easy restore Serial Peripheral Interface (rSPI) 232. The planar type minor 210 (Planar_Type.Minor) is preset in the planar CPLD 236 or mutated by the planar PWA and not mutated by backplanes risers or disallows jumper or switches combinations. The planar type minor 210 defaults to Fh and is set by the CPLD 236 depending on the validity of the values of the rSPI 232 and the SPIO 230 with a user effect of <1 second of boot time.

Exemplary embodiments may also reveal other differences. For example, the planar type minor 210 may be programmed to reveal different mechanical modules (such as rear PCIe card topology) within the same branding model number. Moreover, the programmables (e.g., the planar type minor 210, the SPIO 230, the rSPI 232, and/or the CPLD 236) may have default values not programmed. The system level manufacturing test (after system assembly) may be the entity that first populates the appropriate programmable value(s). The system level manufacturing test may thus be a key enabler to being able to construct many leverages and reused planars and modules and then assign the planar type minor 210 at the last step after assembly versus the old unique hardware mutation methods.

Figure 5:
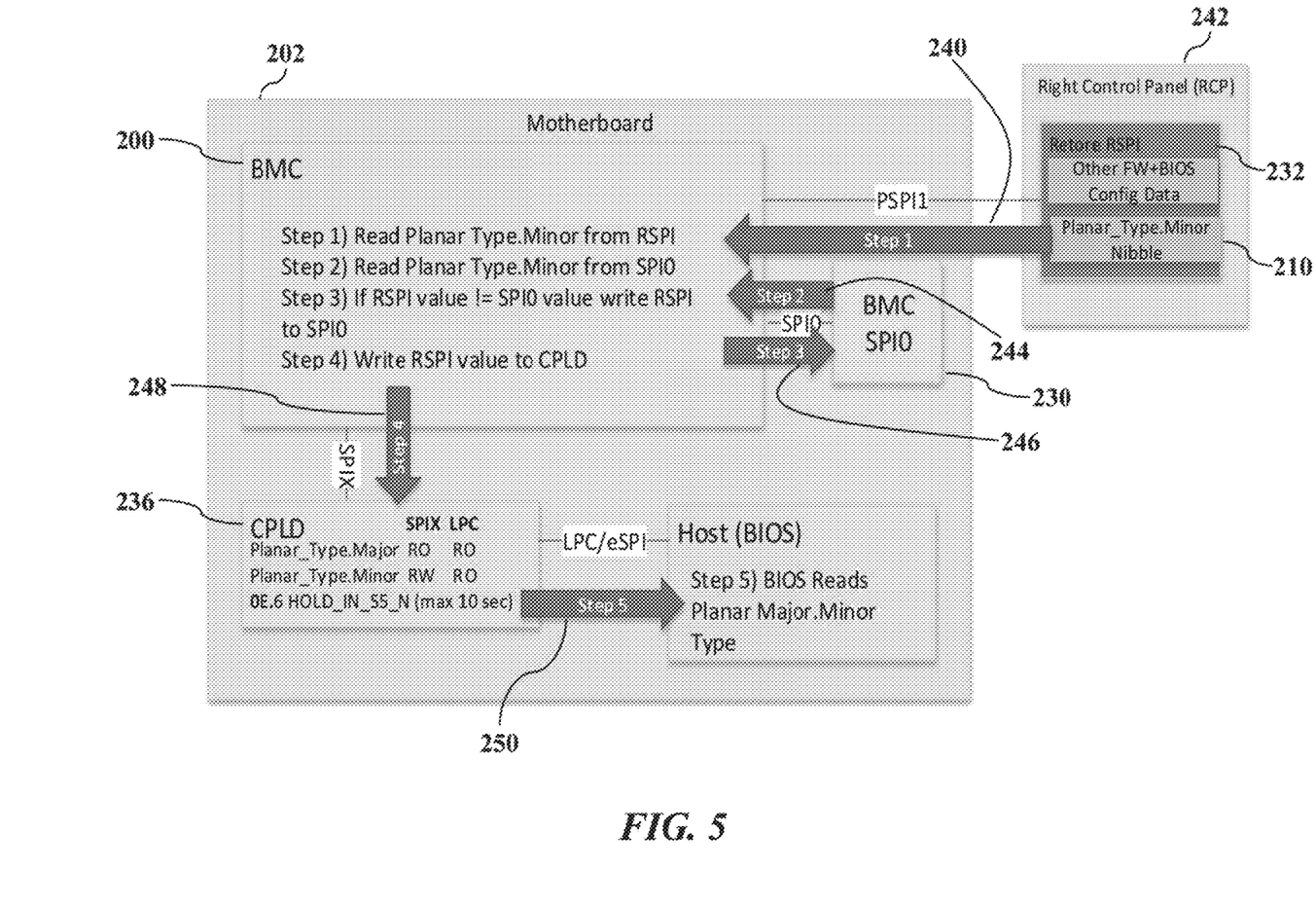
FIG. 5 illustrates an exemplary method or algorithm for planar type mutation, according to exemplary embodiments.

FIG. 5 illustrates an exemplary method or algorithm for planar type mutation, according to exemplary embodiments. In step 1 (illustrated as reference numeral 240), the baseboard management controller 200 executes the boot operation 208 (such as uBoot) and reads or nibbles the planar type minor 210 from the fixed offset in the restore Serial Peripheral Interface (rSPI) 232. The rSPI 232 typically resides in and/or is retrieved from a right control panel 242 within the chassis. In step 2 (illustrated as reference numeral 244), exemplary embodiments also read or nibble the planar type minor 210 from the SPIO 230. In step 3 (illustrated as reference numeral 246), exemplary embodiments inspect the planar type minor 210 obtained from the rSPI 232 and compares to the SPIO 230. If the rSPI 232 is valid and different in value from the SPIO 230, then exemplary embodiments updates rewrite, or copy the value of the SPIO 230 to match the rSPI 232. In step 4 (illustrated as reference numeral 248), exemplary embodiments write the value of the rSPI 232 to the CPLD 236. In step 5 (illustrated as reference numeral 250), the BIOS/EFI module 140 queries the CPLD 236 for, or reads from, the value of the planar type major 212 (e.g., illustrated as "RO"), reads the value associated with the planar type minor 210 (e.g., illustrated as "RW"), and determines the planar type 214.

Figure 6:
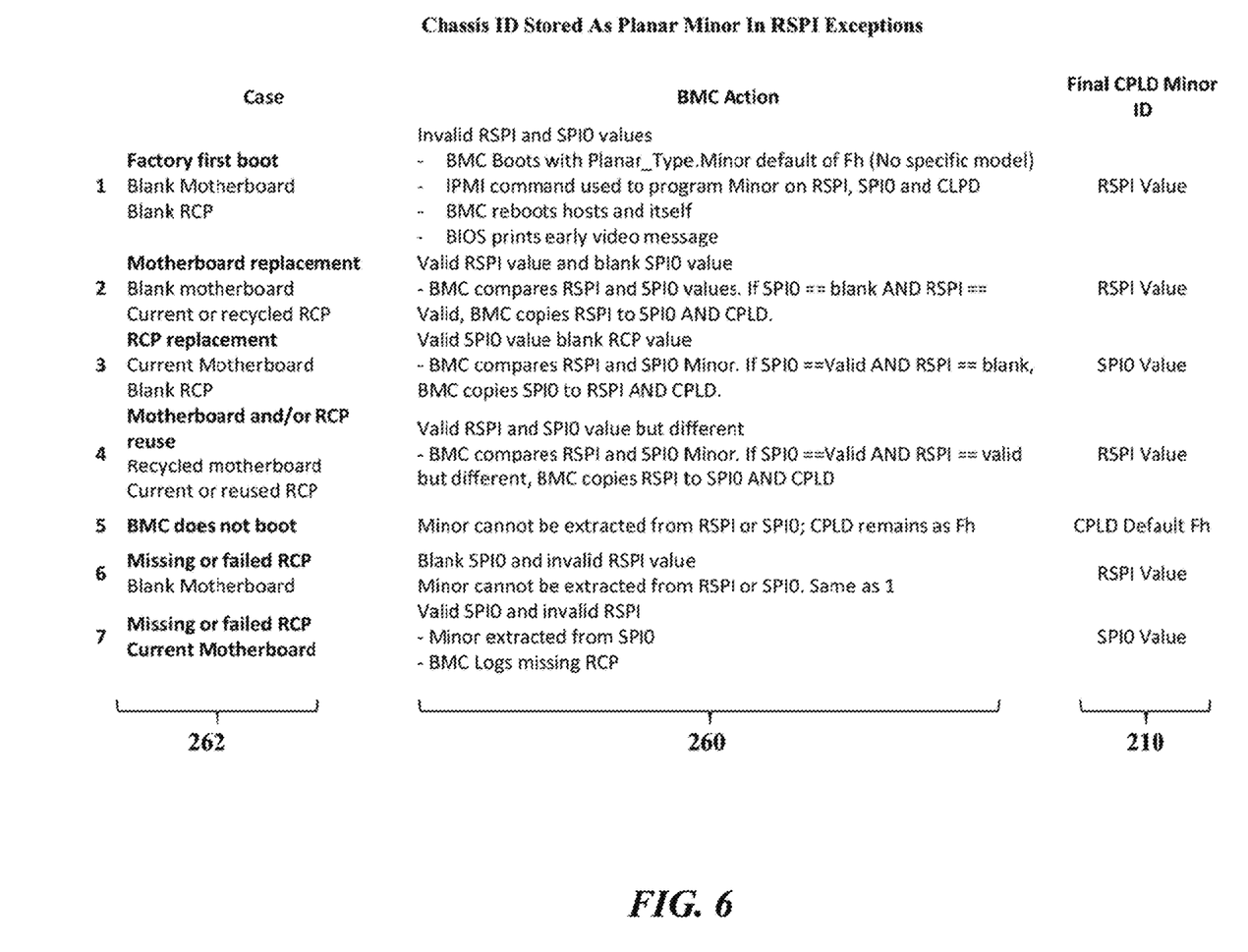
FIG. 6 further illustrates a planar type minor, according to exemplary embodiments.

FIG. 6 further illustrates the planar type minor 210, according to exemplary embodiments. Here the planar type minor 210 may be used as a chassis identifier when branding the information handling system 100 (illustrated in FIG. 1). Exemplary embodiments may consult and/or execute various logical rules or scenarios 260 for determining the value of the planar type minor 210. While in practice there may be many different rules 260, FIG. 6 only illustrates several rules 260 for common cases 262.

The right control panel 242 may thus provide the rSPI 232. The right control panel 242, where the rSPI 232 resides, is always present in the chassis. The rSPI 232 is a service required element on all control panels, which are very low failure rate items. Serviceability does not require manual intervention (perhaps except for case 6 illustrated in FIG. 6) and will avoid mistakes caused by alternate methods like error prone dipswitches on the base board. The right control panel 242 is too small to hold an alternative method, such as a separate TFRU, EEPROM, MCU or discrete straps. An alternate method would have to rely on I²C, which is not available. Exemplary embodiments thus allow for less cost of goods sold, richer configurations, and less unique stock keeping units (SKUs). Exemplary embodiments also allow for more planar reuse flexibility. For example, a single motherboard plane may be reused or rebranded with up to fourteen (14) model designations by a 4-bit nibble excluding 0h and Fh.

Figure 7:
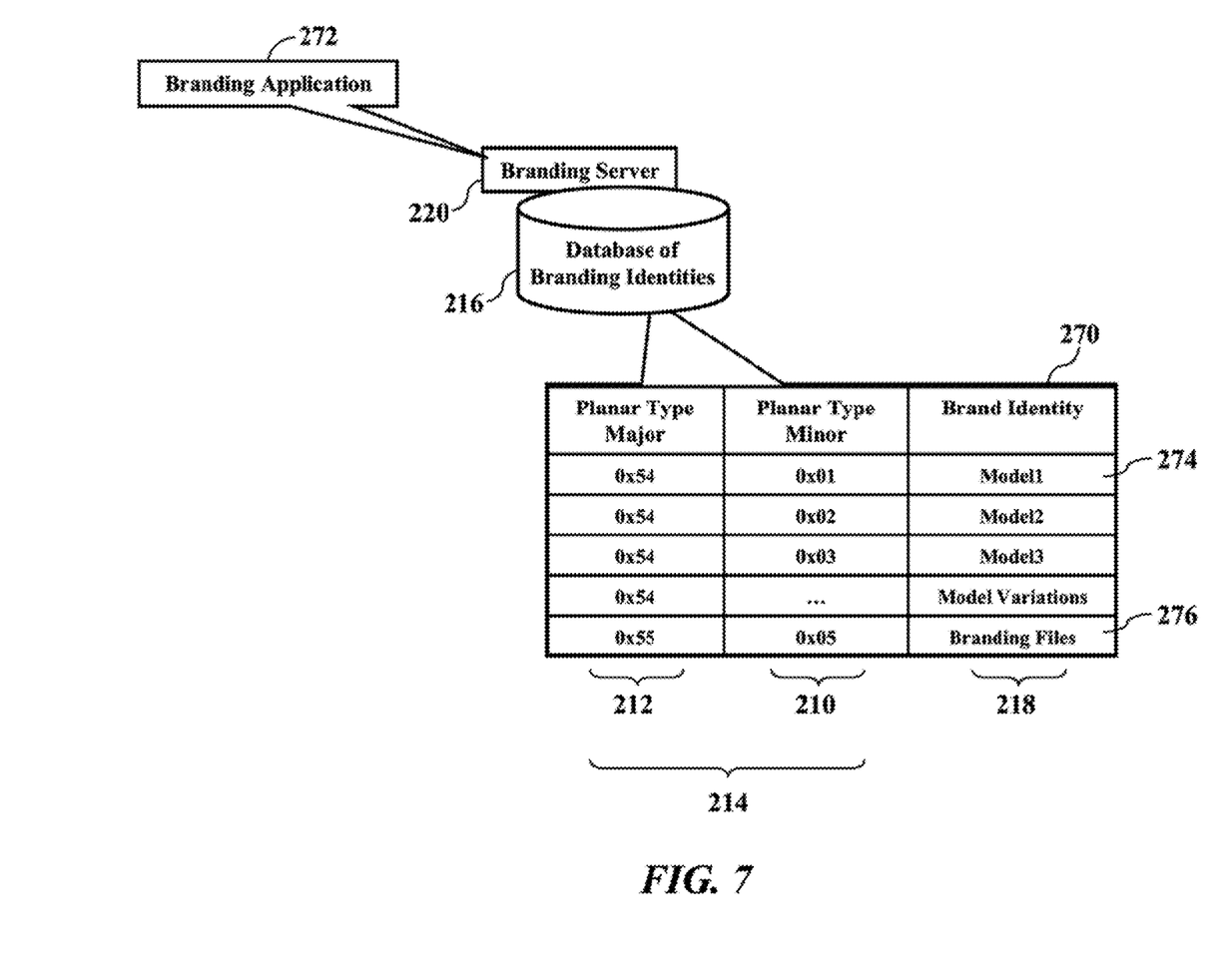
FIG. 7 illustrates an electronic database of branding identities, according to exemplary embodiments.

FIG. 7 further illustrates the electronic database 216 of branding identities, according to exemplary embodiments. As this disclosure above explained, once the planar type 214 is determined, exemplary embodiments may consult the electronic database 216 of branding identities to identify the corresponding branding identity 218. While the electronic database 216 of branding identities may have any structure, most readers are thought familiar with relational databases. FIG. 7 thus illustrates the electronic database 216 of branding identities as a logical table 270 that maps or associates different branding identities 218 for different planar types 214. The branding server 220, for example, may execute a branding application 272 that acts as a query handler. The branding server 220 may receive the planar type 214 as a query parameter, consults the electronic database 216 of branding identities, and identifies the corresponding branding identity 218. For simplicity, each branding identity 218 is illustrated as a different model number 274, but the branding identities 218 may be finely defined by manufacturer, logo, and other branding files 276.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system comprising:
   a hardware processor; and
   a memory device storing instructions that when executed cause the hardware processor to perform operations, the operations including:
   executing a boot operation;
   determining a planar type associated with a motherboard;
   querying an electronic database for the planar type associated with the motherboard, the electronic database having entries that electronically associate branding identities to planar types including the planar type associated with the motherboard; and
   identifying a branding identity of the branding identities in the electronic database that is electronically associated with the planar type.

2. The system of claim 1, wherein the operations further include determining a model number that is electronically associated with the planar type associated with the motherboard.

3. The system of claim 1, wherein the operations further include retrieving a planar type minor.

4. The system of claim 3, wherein the operations further include determining the planar type based on the planar type minor.

5. The system of claim 1, wherein the operations further include retrieving a planar type major.

6. The system of claim 5, wherein the operations further include determining the planar type based on the planar type major.

7. The system of claim 1, wherein the operations further include determining the planar type based on a value of a serial peripheral interface obtained from an operating system.

8. A method of dynamically branding an information handling system, the method comprising:
   executing, by the information handling system, a boot operation;
   determining, by the information handling system, during the boot operation, a planar type minor and a planar type major associated with a motherboard installed within the information handling system;
   querying, by the information handling system, an electronic database for the planar type minor associated with the motherboard, the electronic database having entries that electronically associate branding identities and planar types including the planar type minor associated with the motherboard; and
   identifying one of the branding identities in the electronic database that is electronically associated with the planar type minor.

9. The method of claim 8, further comprising determining a model number that is electronically associated with the planar type minor associated with the motherboard.

10. The method of claim 8, further comprising retrieving the planar type minor.

11. The method of claim 8, further comprising extracting the planar type minor from a value of a restore Serial Peripheral Interface.

12. The method of claim 8, further comprising retrieving the planar type major.

13. The method of claim 11, further comprising reading a value of a Serial Peripheral Interface as the planar type minor.

14. The method of claim 13, wherein if the value of the restore Serial Peripheral Interface matches the value of the Serial Peripheral Interface, then determining the planar type minor is a matching value between the value of the restore Serial Peripheral Interface and the value of the Serial Peripheral Interface.

15. An apparatus storing instructions that when executed cause a hardware processor to perform operations, the operations comprising:
   executing a boot operation by an information handling system;
   determining, during the boot operation, a planar type minor and a planar type major associated with a motherboard;
   constructing a planar type based on the planar type minor and the planar type major;
   querying a branding database for the planar type constructed based on the planar type minor and the planar type major, the electronic database electronically associating branding identities and planar types including the planar type constructed based on the planar type minor and the planar type major; and
   identifying a brand of the branding identities in the electronic database that is electronically associated with the planar type constructed based on the planar type minor and the planar type major.

16. The apparatus of claim 15, wherein the operations further include retrieving the planar type minor.

17. The apparatus of claim 15, wherein the operations further include constructing the planar type once per the boot operation.

18. The apparatus of claim 15, wherein the operations further include holding the information handling system in an S5 power state while the planar type is being constructed based on the planar type minor and the planar type major.

19. The apparatus of claim 15, wherein the operations further include reading a value of a restore Serial Peripheral Interface.

20. The apparatus of claim 19, wherein the operations further include:
   reading a value of a Serial Peripheral Interface;
   determining a matching value between the value of the restore Serial Peripheral Interface and the value of a Serial Peripheral Interface; and
   assigning the planar type minor to the matching value between the value of the restore Serial Peripheral Interface and the value of a Serial Peripheral Interface.

* * * * *